(12) United States Patent
Kim et al.

(10) Patent No.: US 8,891,637 B2
(45) Date of Patent: Nov. 18, 2014

(54) SPECTRAL SHAPING TO REDUCE PEAK-TO-AVERAGE RATIO IN WIRELESS COMMUNICATION

(75) Inventors: Byoung-Hoon Kim, San Diego, CA (US); Durga Prasad Mailadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 698 days.

(21) Appl. No.: 11/672,854

(22) Filed: Feb. 8, 2007

(65) Prior Publication Data

US 2007/0183520 A1    Aug. 9, 2007

Related U.S. Application Data

(60) Provisional application No. 60/771,603, filed on Feb. 8, 2006.

(51) Int. Cl.
| | |
|---|---|
| H04L 27/28 | (2006.01) |
| H04L 1/00 | (2006.01) |
| H04L 25/03 | (2006.01) |
| H04L 27/26 | (2006.01) |

(52) U.S. Cl.
CPC ............ H04L 1/0001 (2013.01); H04L 1/0003 (2013.01); H04L 25/03828 (2013.01); H04L 27/2614 (2013.01); Y02B 60/31 (2013.01)
USPC ........... 375/260; 375/295; 375/316; 375/347; 375/350; 375/267; 375/261

(58) Field of Classification Search
CPC ................... H04B 2201/70706; H04L 5/0064; H04L 27/2614
USPC ................ 375/260, 261, 296, 353; 455/553.1
See application file for complete search history.

(56) References Cited

U.S. PATENT DOCUMENTS

| | | | |
|---|---|---|---|
| 5,430,889 | A | 7/1995 | Hulbert et al. |
| 2005/0271387 | A1 | 12/2005 | Kee et al. |

(Continued)

FOREIGN PATENT DOCUMENTS

| | | |
|---|---|---|
| CN | 1367615 A | 9/2002 |
| EP | 0366485 A2 | 5/1990 |
| RU | 2033693 C1 | 4/1995 |

OTHER PUBLICATIONS

NTT DOCOMO et al; "R1-050702, DFT-Spread OFDM with Pulse Shaping Filter in Frequency Domain in Evolved UTRA Uplink" Internet Citation, [Online] Sep. 2, 2005, XP002440114 Retrieved from the Internet: URL: http://www.3gpp.org/ftp/tsg_ran/WG1_RL1/TSGR1_42/Docs/> [retrieved on Nov. 12, 2011].*

(Continued)

Primary Examiner — Daniel Washburn
Assistant Examiner — Eboni Hughes
(74) Attorney, Agent, or Firm — Dalei Dong

(57) ABSTRACT

Techniques for performing spectral shaping to achieve a desired peak-to-average ratio (PAR) are described. Spectral shaping may be selectively performed for a single-carrier frequency division multiplexing (SC-FDM) signal based on one or more criteria, e.g., in transmit power limited conditions and/or if a modulation scheme with lower PAR is unavailable. At least one parameter of a window function or spectral shaping filter may also be adjusted based on at least one characteristic of the SC-FDM signal. For example, the roll-off of the spectral shaping filter may be adjusted based on the modulation scheme and/or the number of subcarriers used for the SC-FDM signal. A transmitter may perform spectral shaping on modulation symbols, if enabled, to obtain spectrally shaped symbols. Spectral shaping may be performed in the frequency domain either within an allocated bandwidth or with bandwidth expansion. The SC-FDM signal may be generated based on the spectrally shaped symbols.

17 Claims, 9 Drawing Sheets

(56) References Cited

U.S. PATENT DOCUMENTS

2007/0081604 A1* 4/2007 Khan et al. .................. 375/261
2007/0218942 A1* 9/2007 Khan et al. ................ 455/553.1
2010/0316040 A1 12/2010 Kim et al.

OTHER PUBLICATIONS

NTT DOCOMO et al; "R1-050702, DFT-Spread OFDM with Pulse Shaping Filter in Frequency Domain in Evolved UTRA Uplink" Internet Citation, [Online] Sep. 2, 2005, XP002440114 Retrieved from the Internet: URL: http://www.3gpp.org/ftp/tsg_ran/WGI_RD/TSGR1 42/Docs/> [retrieved on Nov. 12, 2011].*

NTT DOCOMO et al; "R1-050702, DFT-Spread OFDM with Pulse Shaping Filter in Frequency Domain in Evolved UTRA Uplink" Internet Citation, [Online] Sep. 2, 2005, XP002440114 Retrieved from the Internet: URL: http://www.3gpp.org/ftp/tsg_ran/WGI_RL1/TSGR1 42/Docs/> [retrieved on Nov. 12, 2011].*

Huawei: "Cubic metric performances of optimum spectrum-shaping functions for PAPR reduction", R1-060227, 3GPP TSG RAN WG1 LTE Ad Hoc, Helsinki, Finland, Jan. 23-25, 2006, XP002440117.

Huawei: "Optimum family of spectrum-shaping functions for PAPR reduction in SC-FDMA", 3GPP TSG RAN WG1 43, Seoul, Korea, Nov. 7-11, 2005, R1-051434, XP002440116.

International Search Report and Written Opinion—PCT/US2007/061884, International Search Authority—European Patent Office—Jul. 13, 2007.

NTT DoCoMo, NEC, SHARP: "DFT-Spread OFDM with Pulse Shaping Filter in Frequency Domain in Evolved UTRA Uplink", R1-050702, 3GPP TSG RAN WG1 #42 on LTE, London, UK, Aug. 29-Sep. 2, 2005, XP002440114.

Qualcomm Europe: "PAR Reduction through Frequency Domain Spectrum Shaping" 3GPP TSG-RAN WG1 #44, R1-060470, Denver, USA, Feb. 13-17, 2006, XP002440118.

Samsung: "Spectrum shaping filter in DFT-spread OFDM", R1-051038, 3GPP TSG RAN WG1 Meeting #42BIS, San Diego, USA, Oct. 10-14, 2005, XP002440115.

Taiwan Search Report—TW096104678—TIPO—Jul. 5, 2011.

* cited by examiner

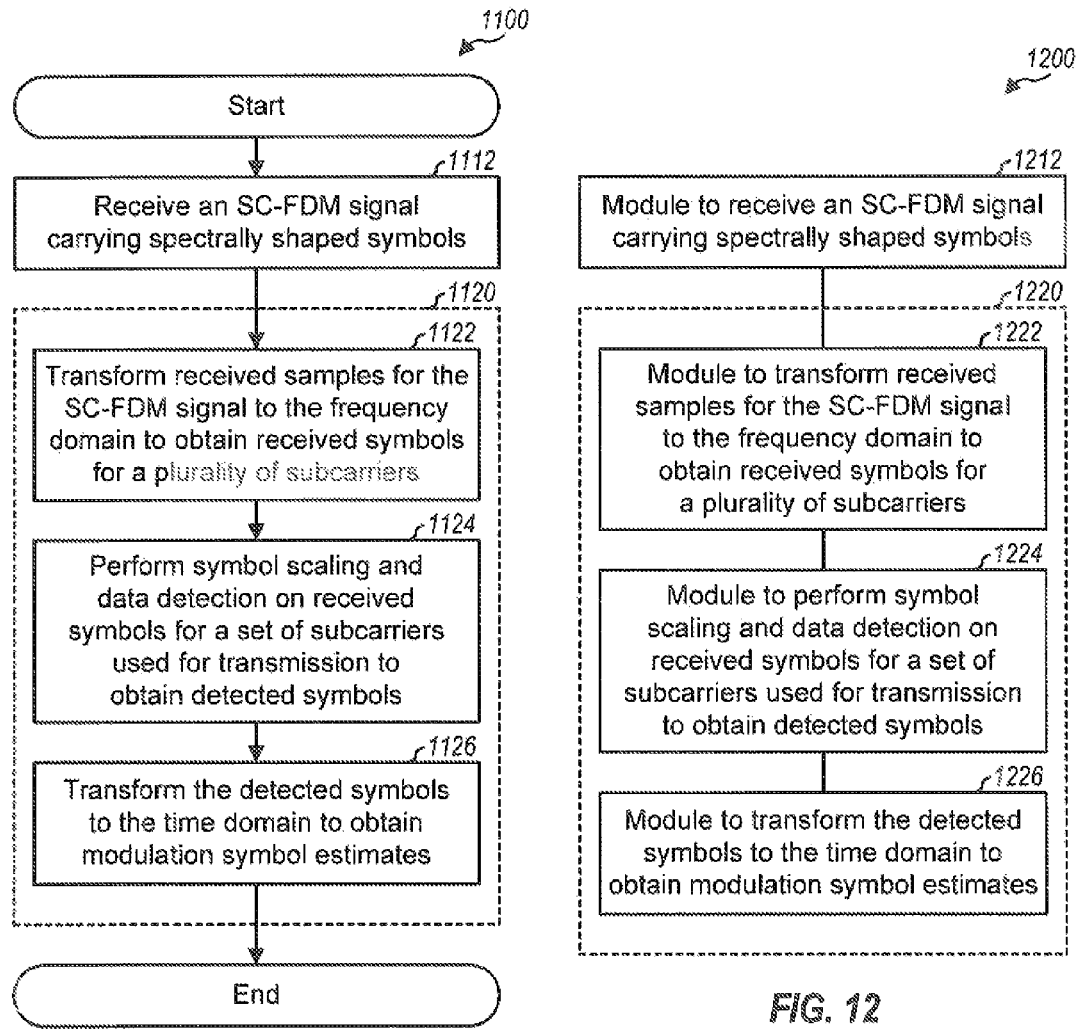

SPECTRAL SHAPING TO REDUCE PEAK-TO-AVERAGE RATIO IN WIRELESS COMMUNICATION

The present application claims priority to provisional U.S. Application Ser. No. 60/771,603, entitled "METHOD OF MAINTAINING A PEAK TO AVERAGE RATIO IN A WIRELESS COMMUNICATION SYSTEM," filed Feb. 8, 2006, assigned to the assignee hereof and incorporated herein by reference.

BACKGROUND

I. Field

The present disclosure relates generally to communication, and more specifically to techniques for reducing peak-to-average ratio (PAR) in wireless communication.

II. Background

Wireless communication systems are widely deployed to provide various communication services such as voice, video, packet data, messaging, broadcast, etc. These wireless systems may employ various multiplexing schemes such as code division multiplexing (CDM), time division multiplexing (TDM), frequency division multiplexing (FDM), orthogonal frequency division multiplexing (OFDM), single-carrier FDM (SC-FDM), etc. OFDM and SC-FDM partition an overall system bandwidth into multiple orthogonal subcarriers, which are also referred to as tones, bins, etc. Each subcarrier may be modulated with data. In general, modulation symbols are sent in the frequency domain with OFDM and in the time domain with SC-FDM.

A metric that is pertinent for all multiplexing schemes is peak-to-average ratio (PAR), which is also commonly referred to as peak-to-average power ratio (PAPR), PAR is the ratio of the peak power of a signal to the average power of the signal. A high PAR is undesirable since it may require a power amplifier (PA) to be operated at an average output power that may be much lower than the peak output power, or backed off from peak power. This is because large peaks in the signal may cause the PA to operate in a highly non-linear region or possibly clip, which may then cause intermodulation distortion and other artifacts that may degrade signal quality. By operating the PA at a backoff from peak power, where the backoff may be dependent on the PAR, the PA may be able to handle large peaks in the signal without generating excessive distortion. However, the backoff results in inefficient operation of the PA at times when large peaks are not present in the signal. Thus, it is desirable to reduce the PAR of the signal so that the PA may be operated closer to the peak output power, if necessary.

There is therefore a need in the art for techniques to reduce PAR in wireless communication.

SUMMARY

Techniques for performing spectral shaping to achieve a desired PAR for a signal in a wireless communications system are described herein. In an aspect, spectral shaping may be selectively performed for an SC-FDM signal based on one or more criteria. For example, spectral shaping may be performed in transmit power limited conditions and/or if a modulation scheme with lower PAR is unavailable. In another aspect, if spectral shaping is performed, then at least one parameter of a window function or spectral shaping filter may be adjusted based on at least one characteristic of the SC-FDM signal. For example, the roll-off of the spectral shaping filter may be adjusted based on the modulation scheme and/or the number of subcarrier used for the SC-FDM signal.

A transmitter may performed spectral shaping on modulation symbols, if enabled, to obtain spectrally shaped symbols. The spectral shaping may be performed in the frequency domain either within an allocated bandwidth or with bandwidth expansion. The modulation symbols may be transformed to the frequency domain to obtain frequency-domain symbols. Spectral shaping may then be performed on the frequency-domain symbols, e.g., by multiplying the frequency-domain symbols element-wise with the window function, to obtain the spectrally shaped symbols. An SC-FDM signal may then be generated based on the spectrally shaped symbols, e.g., by mapping the spectrally shaped symbols to a set of subcarriers assigned to the transmitter, transforming the mapped symbols to the time domain, an appending a cyclic prefix to each SC-FDM symbol.

Various aspects and features of the disclosure are described in further detail below.

BRIEF DESCRIPTION OF THE DRAWINGS

FIG. 11 shows a process performed by a receiver for data reception.

FIG. 12 shows an apparatus for data reception.

DETAILED DESCRIPTION

Figure 1:
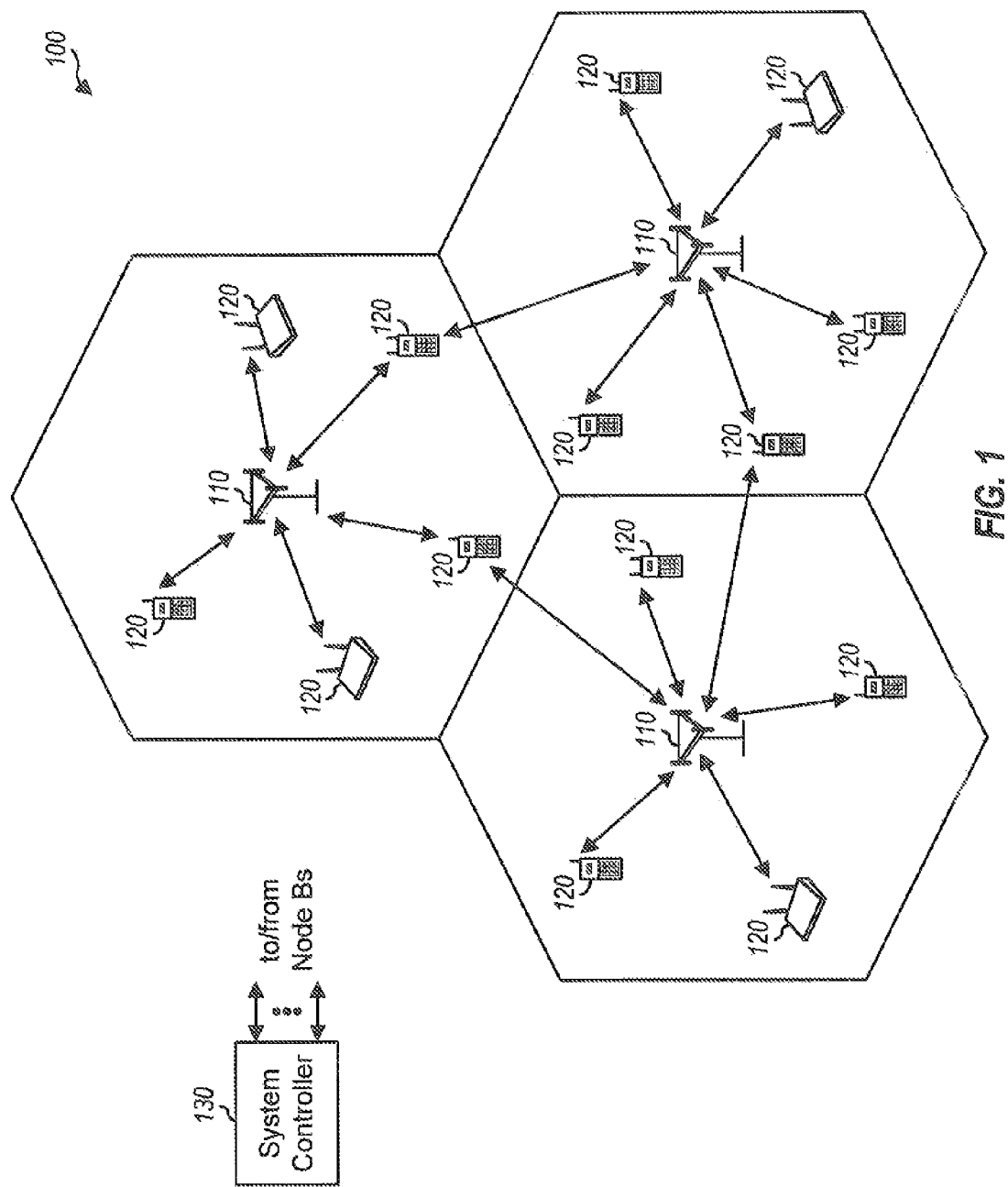
FIG. 1 shows a wireless communication system.

FIG. 1 shows a wireless communication system 100 with multiple Node Bs 110 and multiple UEs 120. A Node B is generally a fixed station that communicates with the UEs and may also be referred to as an evolved Node B (eNode B), a base station, an access point, etc. Each Node B 110 provides communication coverage for a particular geographic area and supports communication for the UEs located within the coverage area. The term "cell" can refer to a Node B and/or its coverage area depending on the context in which the term is used. A system controller 130 may couple to Node Bs 110 and provide coordination and control for these Node Bs. System controller 130 may be a single network entity or a collection of network entities, e.g., an Access Gateway (AGW), a Radio Network Controller (RNC), etc.

UEs 120 may be dispersed throughout the system, and each UE may be stationary or mobile. A UE may also be referred to as a mobile station, a mobile equipment, a terminal, an access terminal, a subscriber unit, a station, etc. A UE may be a cellular phone, a personal digital assistant (PDA), a wireless communication device, a handheld device, a wireless modem, a laptop computer, etc. A UE may communicate with zero, one, or multiple Node Bs on the downlink and/or uplink at any given moment. The downlink (or forward link) refers to the communication link from the Node Bs to the UEs, and the uplink (or reverse link) refers to the communication link from the UEs to the Node Bs.

System 100 may utilize SC-FDM, OFDM, and/or other multiplexing schemes. SC-FDM includes (i) localized FDM (LFDM) which transmits data on contiguous subcarriers, (ii) interleaved FDM (IFDM) which transmits data on subcarriers that are distributed across the system bandwidth, (iii) enhanced FDM (EFDM) which transmits data on multiple groups of contiguous subcarriers, and (iv) other variants of SC-FDM. LFDM is also referred to as narrowband FDM, classical FDM, etc. IFDM is also referred to as distributed FDM.

In general, system 100 may utilize one or more multiplexing schemes for the downlink and uplink. For example, system 100 may utilize (i) OFDM for the downlink and SC-FDM for the uplink, (ii) SC-FDM for both the downlink and uplink, (iii) one version of SC-FDM (e.g., LFDM) for one link and another version of SC-FDM (e.g., IFDM) for the other link, or (iv) some other combination of multiplexing schemes. It may be desirable to use SC-FDM on the uplink to achieve lower PAR and to relax power amplifier requirements for the UEs. It may be desirable to use OFDM on the downlink to potentially achieve higher system capacity. In general, SC-FDM, OFDM, and/or other multiplexing schemes may be used for each link to achieve the desired performance. For clarity, certain aspects of the techniques are described below for uplink transmission from a UE to a Node B with SC-FDM.

Figure 2A:
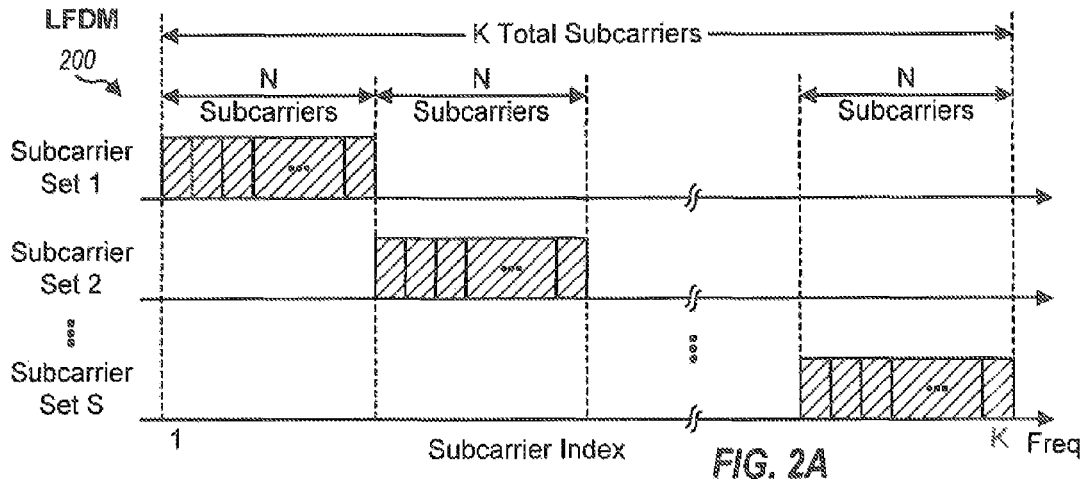
FIGS. 2A to 2C show three subcarrier structures for SC-FDM.

FIG. 2A shows a subcarrier structure 200 for LFDM. The overall system bandwidth of BW MHz is partitioned into multiple (K) orthogonal subcarriers that are given indices of 1 through K, where K may be any integer value. The spacing between adjacent subcarriers is BW/K MHz. A subset of the K total, subcarriers may be usable for transmission. The remaining subcarriers, which are typically located at the two band edges, may serve as guard subcarriers to allow the system to meet spectral mask requirements. For simplicity, the following description assumes that all K total subcarriers are usable for transmission. For subcarrier structure 200, the K total subcarriers are arranged into S non-overlapping sets, with each set containing N contiguous subcarriers, where S>1, N>1 and K=S·N. Set s, for s∈{1, . . . , S}, contains subcarriers $(s-1) \cdot N+1$ through $s \cdot N$.

Figure 2B:
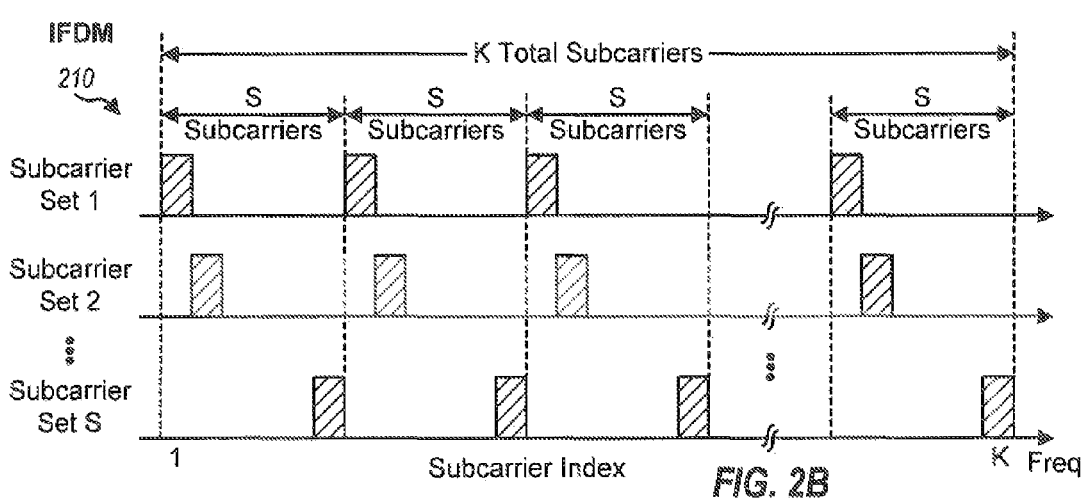

FIG. 2B shows a subcarrier structure 210 for IFDM. For subcarrier structure 210, the K total subcarriers are arranged into S non-overlapping sets, with each set containing N subcarriers that are uniformly distributed across the K total subcarriers, where K=S·N. Consecutive subcarriers in each set are spaced apart by S subcarriers. Set s for s∈{1, . . . , S}, contains s, s+S, s+2 S, etc.

Figure 2C:
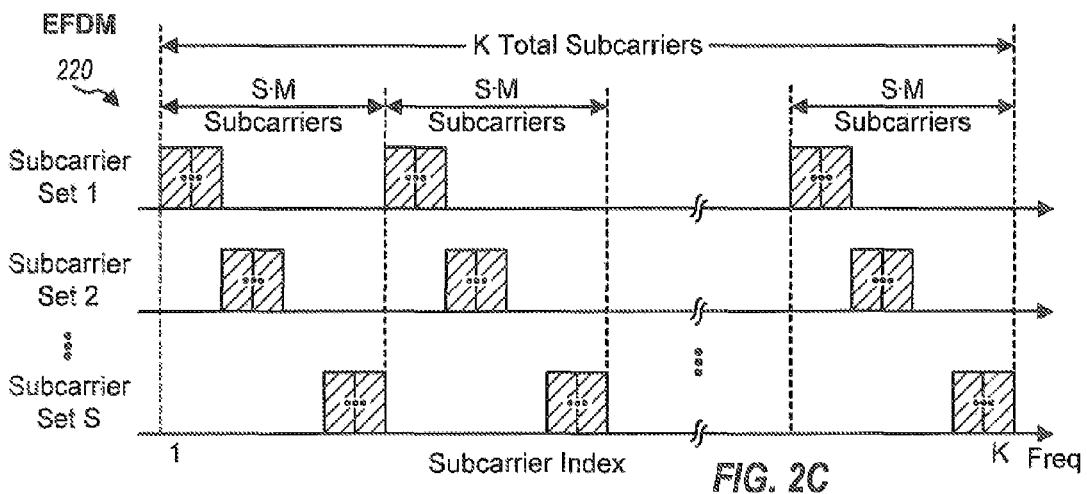

FIG. 2C shows a subcarrier structure 220 for EFDM. For subcarrier structure 220, the K total subcarriers are arranged into S non-overlapping sets, with each set containing G groups of subcarriers that distributed across the K total subcarriers. For each set, the G groups are spaced apart by S·M subcarriers, and each group contains M consecutive subcarriers, where N=G·M.

In general, a subcarrier structure may include any number of non-overlapping subcarrier sets. Each subcarrier set may contain any number of subcarriers and any one of the K total subcarriers. The subcarrier sets may contain the same or different numbers of subcarriers. For each set, the subcarriers in the set may be adjacent to one another as shown in FIG. 2A, uniformly distributed across the system bandwidth as shown in FIG. 2B, arranged in multiple groups that may be distributed across the system bandwidth as shown in FIG. 2C, or distributed across the system bandwidth in other manners. Different UEs may be assigned different subcarrier sets and would then be orthogonal to one another in the frequency domain.

System 100 may support various modulation schemes such as binary phase shift keying (BPSK), quadrature phase shift keying (QPSK), M-ary phase shift keying (M-PSK), quadrature amplitude modulation (QAM), etc. Each modulation scheme is associated with a specific signal constellation containing $2^B$ signal points, where B=1 for BPSK, B=2 for QPSK, B=4 for 16-QAM, etc. Each signal point is a complex value for a modulation symbol and is associated with a different B-bit binary value. In general, higher order modulation schemes are associated with signal constellations containing more signal points, and more bits may mapped to each modulation symbol.

Figure 3A:
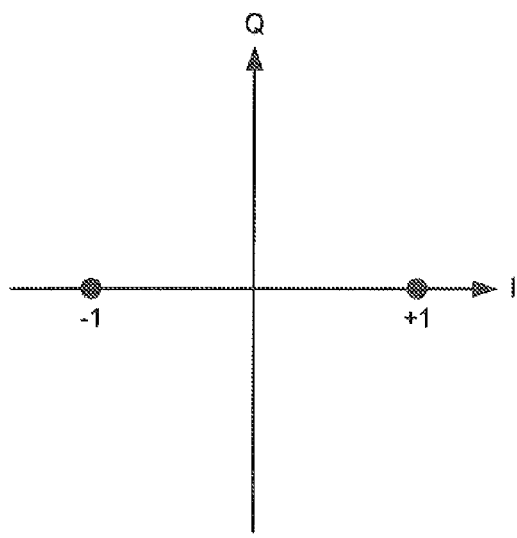
FIGS. 3A to 3D show signal constellation for four modulation schemes.

FIG. 3A shows a signal constellation for BPSK. The signal constellation has two signal points on a real or inphase (I) axis as +1 and −1. Alternatively, the two signal points may be defined on an imaginary or quadrature (Q) axis (not shown in FIG. 3A).

Figure 3B:
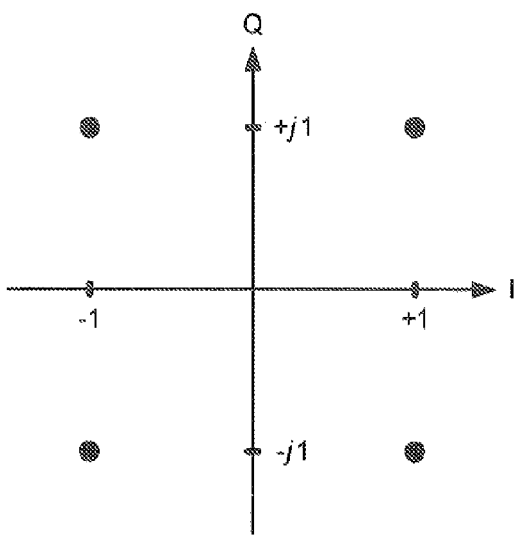

FIG. 3B shows a signal constellation for QPSK. This signal constellation has four signal points at 1+j, 1−j, −1 +j, and −1−j. The four signal points are thus located at ±1 on the real axis and ±1 on the imaginary axis.

Figure 3C:
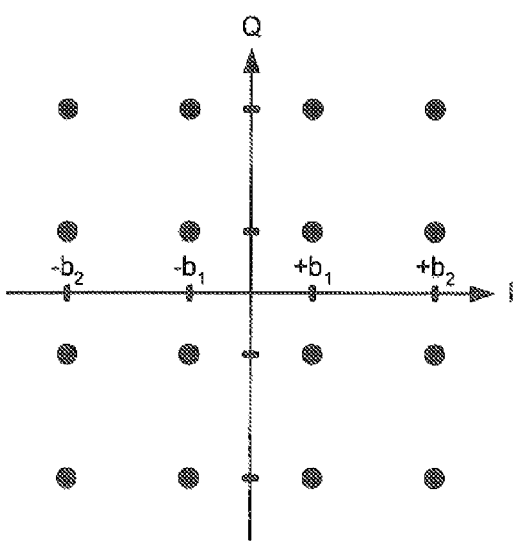

FIG. 3C shows a signal constellation for 16-QAM. This signal constellation has 16 signal points at $\pm b_1$ and $\pm b_2$ on both the real and imaginary axes, where $b_1$ and $b_2$ are suitably selected values.

Figure 3D:
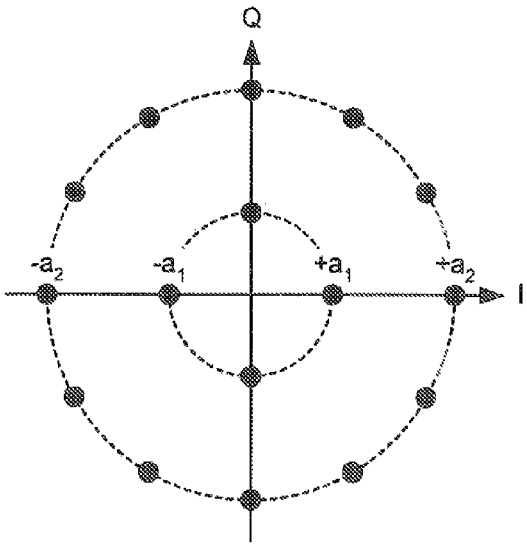

FIG. 3D shows a signal constellation for circular 16-QAM. This signal constellation has 16 signal points located on two circles. Four signal points are located on an inner circle with a radius of $a_1$. The remaining twelve signal points are located on an outer circle with a radius of $a_2$. The ratio $a_2/a_1$ may be varied, e.g., from 1.5 to 3.

FIGS. 3A through 3D show signal constellations for four modulation schemes that may be supported by the system. The system may also support different and/or other modulation schemes, e.g., 64-QAM, 256-QAM, etc.

For SC-FDM, a sequence of modulation symbols may be transmitted in the time domain of a set of subcarriers used for transmission. The modulation symbols may be generated based on one or more modulation schemes. Each modulation symbol is a complex value for a signal point in a signal constellation. An SC-FDM signal may be generated for the sequence of modulation symbols. The power of the SC-FDM signal may vary over time. The amount of power variation may be dependent on the signal constellation(s) used to generate the modulation symbols. In general, the power variation may be greater for higher order modulation schemes (e.g., 16-QAM) and less for lower order modulation schemes (e.g., QPSK).

The amount of variation in the power of the SC-FDM signal may be quantified by PAR. A cumulative distribution function (CDF) of the instantaneous power of the SC-FDM signal may be obtained, e.g., via computer simulation. For a given power level, the probability or amount of time the instantaneous signal power is below this power level may be determined from the CDF. A reference power level may be defined as a power level below which the instantaneous signal power remains for a particular percentage (e.g., 99.9%) of the time. This percentage is referred to as an operating point. In general, the reference power level is higher for higher operating point. The PAR, in units of decibel (dB), for a given operating point may be defined as the difference between the reference power level for that operating point and the average power.

The PAR for a given operating point (e.g., 99.9%) is indicative of the amount of power variation in the SC-FDM signal. To avoid saturation of a power amplifier (PA), which may result in non-linearity and intermodulation distortion, the PA may be operated with a backoff that may be dependent on the PAR. A backoff of x dB may mean that the average signal power at the PA output is limited to x dB below the maximum PA output power. The backoff allows the PA to amplify large signal peaks without generating excessive intermodulation distortion. A large backoff may be used for a large PAR to ensure that the PA has sufficient margin or headroom to account for large signal peaks. However, operating the PA with a large backoff due to a large PAR leads to inefficient PA operation.

PAR may be reduced by performing spectral shaping in the frequency domain. Spectral shaping refers to modification of a signal to achieve a desired spectral response. PAR may be reduced by attenuating frequency components at the two band edges with a window function such as a raised cosine window, a root raised cosine (RRC) window, a Bessel window, a Hanning window, a Gaussian window, a triangular window, or some other window with tapered edges.

Spectral shaping may improve PA efficiency by reducing PAR, which may then allow the PA to be operated at a higher average output power with less backoff. However, spectral shaping may also result in loss in link efficiency due to attenuation of frequency components at the band edges. The attenuated frequency components may effectively reduce the bandwidth utilized for transmission.

In an aspect, spectral shaping may be selectively performed when the gain in PA efficiency more than offset the loss in link efficiency. A decision on whether or not to perform spectral shaping may be made on various factors such as:

The number of subcarriers assigned for transmission, or allocated bandwidth,
The modulation scheme used to generate modulation symbols, and
The UE location or path loss.

The terms "assign" and "allocate" are sometimes used interchangeably.

Spectral shaping may be advantageously applied when a UE is in transmit power limited conditions, which is a situation in which using more transmit power (if available) would be beneficial. Whether or not the UE is in transmit power limited conditions may be dependent on the number of assigned subcarriers, the UE location, etc. For a given maximum PA output power (e.g., 21 dBm), the UE is more likely to be in transmit power limited conditions when more subcarriers are assigned. This is because more transmit power is used for more subcarriers in order to achieve a given signal-to-noise ratio (SNR) per subcarrier. The required transmit power may thus scale linearly with the number of subcarriers. The UE is also more likely to be in transmit power limited conditions when located at cell edge or when observing large path loss to a serving cell. This is because more transmit power may be needed in order to account for the large path loss and achieve a desired SNR at the serving cell. When the UE is in transmit power limited conditions, applying spectral shaping may reduce the PAR, which may then allow the UE to operate its PA with a smaller backoff and thus increase the average PA output power. The gain in PA efficiency may more than offset the loss in link efficiency when the UE is in transmit power limited conditions.

Conversely, when the number of assigned subcarriers is small and/or the path loss is small, the UE may be able to achieve the desired SNR per subcarrier with relatively low PA output power. When the UE is not in transmit power limited conditions, applying spectral shaping may result in loss in link efficiency without any noticeable gain in PA efficiency.

PAR is typically higher for higher order modulation schemes. PAR may be reduced by selecting progressively lower order modulation schemes until QPSK is reached, e.g., going from 64-QAM to 16-QAM, and then from 16-QAM to QPAK. Higher order modulation schemes may be selected under good channel conditions and/or when the UE is not in transmit power limited conditions. In these cases, spectral shaping may be bypassed, and the modulation order may be reduced instead, if needed, to lower PAR. Spectral shaping may be applied for lower order modulation schemes, e.g., QPSK. In general, a decision on whether or not to perform spectral shaping may be made based solely on modulation scheme, based on modulation scheme and other factors such as those noted above, or based on factors other than modulation scheme.

Figure 4:
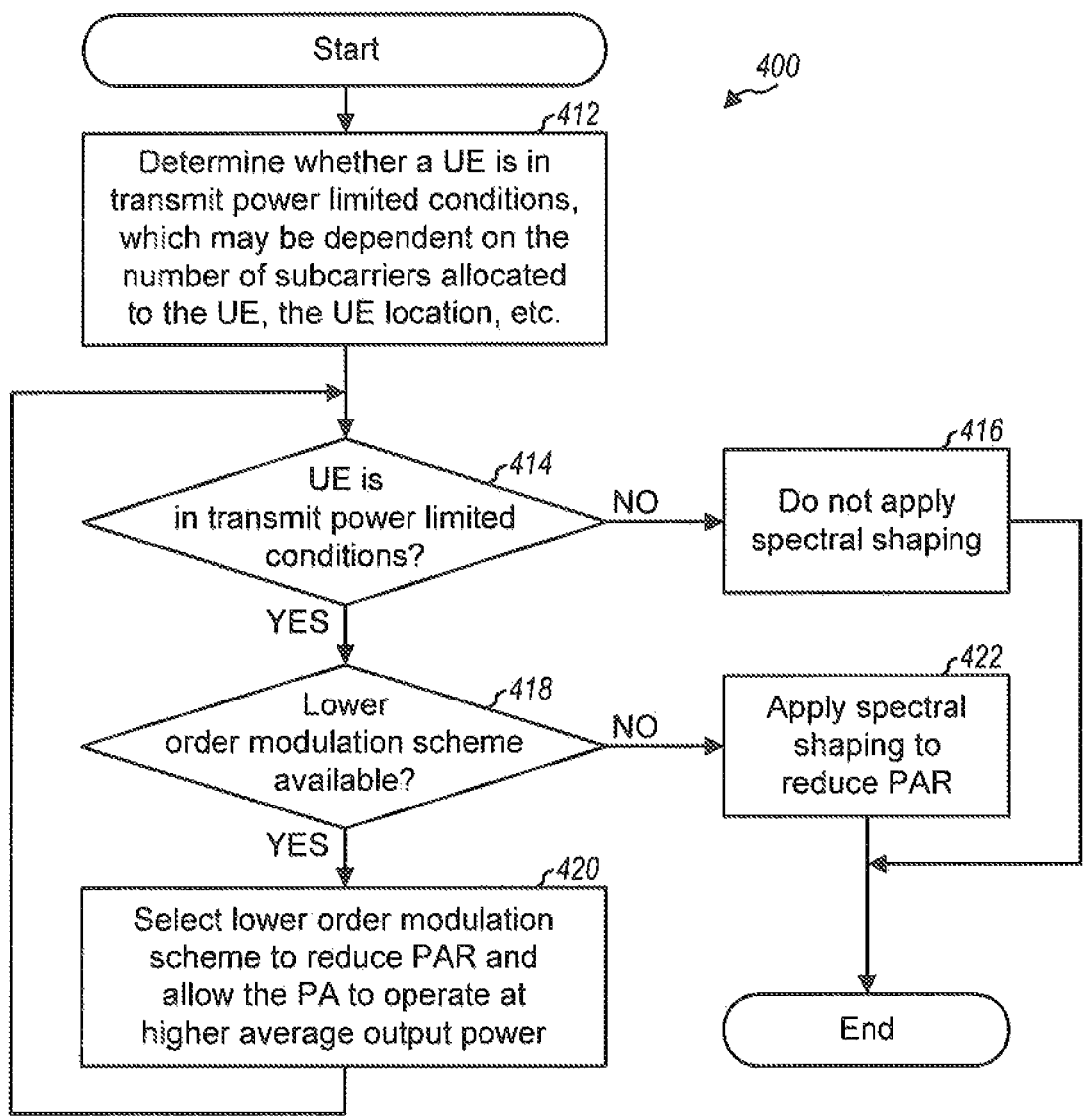
FIG. 4 shows a process for selectively applying spectral shaping.

FIG. 4 shows a design of a process 400 for selectively applying spectral shaping. A determination is made whether a UE is in transmit power limited conditions, which may be dependent on the number of subcarriers allocated to the Ue, the UE location, etc. (block 412). The Ue may be considered to be in transmit power limited conditions it operating the PA at a higher average output power would improve performance. If the UE is not in transmit power limited conditions, as determined in block 414, then spectral shaping may be bypassed (block 416). Otherwise, if the Ue is in transmit power limited conditions, then a determination may be made whether a lower order modulation scheme associated with lower PAR (e.g., QPSK) is available (block 418). If the answer is 'Yes', then the lower order modulation scheme may be selected to reduce PAR and allow the PA to operate at higher average output power (block 420). Otherwise, if a lower order modulation scheme with lower PAR is not available, then spectral shaping may be applied to reduce PAR (block 422).

FIG. 4 shows a specific design in which spectral shaping is applied when the UE is in transmit power limited conditions and if a lower order modulation scheme with lower PAR is not available. In general, spectral shaping may be selectively applied based on any one or more criteria, which may be defined based on any factors. For example, spectral shaping may be applied when the UE is in transmit power limited conditions, regardless of the modulation scheme. As another example, spectral shaping may be selectively applied based on the number of subcarriers and/or the modulation scheme, e.g., in accordance with a predetermined set of rules.

If spectral shaping may be selectively applied, then the UE may send signaling to the Node B whenever spectral shaping is applied. For example, the Node B may direct or inform the UE whether or not to perform spectral shaping, and the UE may simply obey the directive from the Node B. Spectral shaping may also be applied based on one or more predetermined criteria or rules that may be known a priori by both the UE and Node B. In this case, the Node B may presume that spectral shaping is applied by the UE whenever the one or more criteria or rules are satisfied, and signaling may be omitted. The processing at the Node B may be dependent on whether or not spectral shaping is applied at the UE. For example, the attenuated frequency components may be given less weight in the decoding process when spectral shaping is applied.

In another aspect, one or more parameters of a window function or spectral shaping filter may be varied based on one or more signal characteristics such as modulation scheme, the number of allocated subcarriers, etc. In one design, the transition edges of the spectral shaping filter are selected based on the modulation scheme and number of subcarriers. For example, wider transition edges may be used for a lower oder modulation scheme and/or a larger number of subcarriers. More narrow transition edges may be used for a higher order modulation scheme and/or a smaller number of subcarriers. The transition edges may be selected to maintain an approximately constant PAR, which may reduce the loss in link efficiency while allowing the PA to be operated at a constant backoff.

Figure 5:
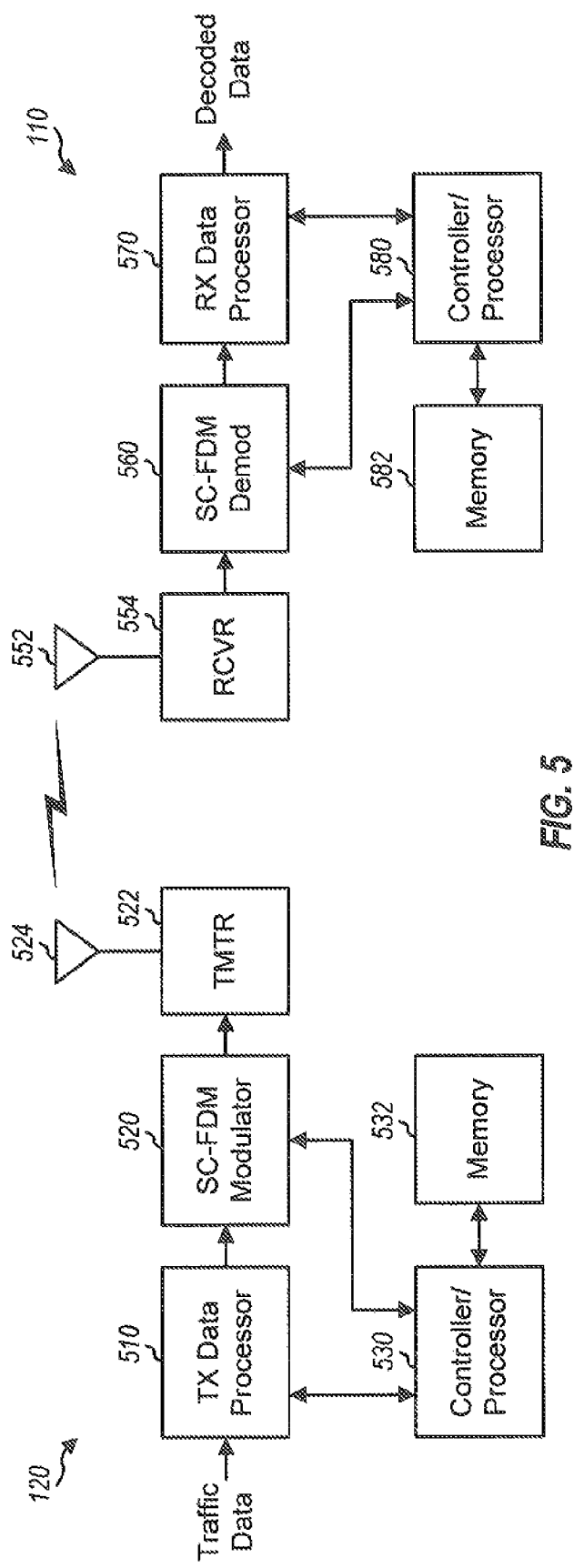
FIG. 5 shows a block diagram of a user equipment (UE) and a Node B.

FIG. 5 shows a block diagram of a design of a UE 120 and a Node B 110, which are one of the UEs and Node Bs in FIG. 1. For simplicity, only processing units for uplink transmission are shown in FIG. 5.

At UE 120, a transmit (TX) data processor 510 receives traffic data and signaling to send to Node B 110, processes (e.g., encodes, interleaves, and symbol maps) the traffic data, signaling, and pilot, and provides modulation symbols. An SC-FDM modulator 520 performs SC-FDM modulation on the modulation symbols as described below and provides output samples. A transmitter (TMTR) 522 processes (e.g., converts to analog, amplifies, filters, and frequency upconverts) the output samples and generates an uplink signal, which is transmitted via an antenna 524.

At Node B 110, an antenna 522 receives the uplink signal from UE 120 and provides a received signal to a receiver (RCVR) 544. Receiver 544 processes (e.g., filters, amplifies, frequency downconverts, and digitized) the received signal and provides received samples. An SC-FDM demodulator (Demod) 560 performs SC-FDM demodulation on the received samples as described below and provides modulation symbol estimates, which are estimates of the modulation symbols sent by UE 120. A receive (RX) data processor 570 processes (e.g., symbol demaps, deinterleaves, and decodes) the modulation symbol estimates and provides decoded data and signaling. In general, the processing by SC-FDM demodulator 560 and RX data processor 570 at Node B 110 is complementary to the processing by SC-FDM modulator 520 and TX data processor 510, respectively, at UE 120.

Controllers/processors 530 and 580 direct the operation at UE 120 and Node B 110, respectively. Memories 532 and 582 store program codes and data for UE 120 and Node B 110, respectively.

Figure 6:
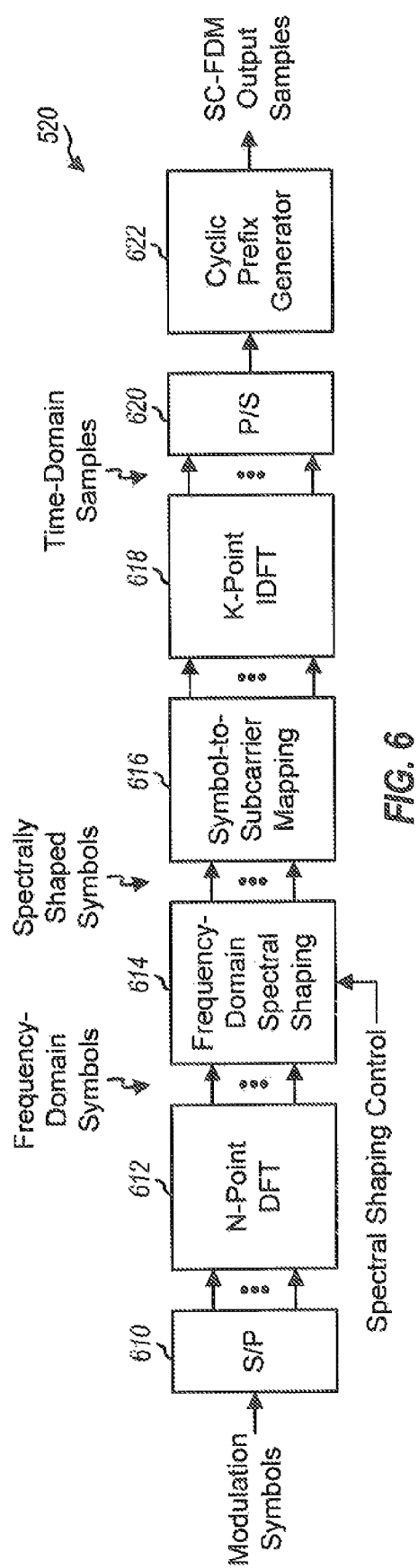
FIG. 6 shows a block diagram of an SC-FDM modulator.

FIG. 6 shows a block diagram of a design of SC-FDM modulator 520 at UE 120 in FIG. 5. Within SC-FDM modulator 520, a serial-to-parallel converter (s/P) 610 receives the modulation symbols from TX data processor 510 and, in each SC-FDM symbol period, provides N modulation symbols for N subcarriers assigned to the UE. A discrete Fourier transform (DFT) unit 612 performs an N-point DFT on the N modulation symbols, transforms these modulations symbols from the time domain to the frequency domain, and provides N frequency-domain symbols. A spectral shaping unit 614 receives the N frequency-domain symbols from DFT unit 612 and spectral shaping control from controller 530. Unit 614 performs spectral shaping on the frequency-domain symbols in the frequency domain when enabled and as indicated by the spectral shaping control and provides N spectrally shaped symbols. A symbol-to-subcarrier mapping unit 616 receives the N spectrally shaped symbols, maps these symbols to the N subcarriers assigned to the UE, and maps zero symbols with signal value of zero to the K−N remaining subcarriers. The N assigned subcarriers may be contiguous as shown in FIG. 2A, distributed across the system bandwidth as shown in FIG. 2B, distributed in groups across the system bandwidth as shown in FIG. 2C, etc.

An inverse DFT (IDFT) unit 618 receives K symbols from mapping unit 616 for the K total subcarriers, performs a K-point IDFT on these K symbols to transform the symbols from the frequency domain to the time domain, and provides N time-domain samples. Each time-domain sample is a complex value to be transmitted in one sample period. A parallel-to-serial converter (P/S) 620 serializes the K time-domain samples and provides a useful portion of an SC-FDM symbol. A cyclic prefix generator 622 copies the last C samples of the useful portion and appends these C samples to the front of the useful portion to form an SC-FDM symbol contains K+C samples. The cyclic prefix is used to combat inter-symbol interference (ISI) caused by frequency selective fading. An SC-FDM symbol period is the duration of one SC-FDM symbol and is equal to K+C sample periods.

The spectral shaping may be performed based on various windows. In one design, the spectral shaping is based on a raised cosine window, which may be expressed as:

$$w_{rc}(n) = \begin{cases} 0.5 + 0.5\cos(\pi + \pi \cdot n/L) & \text{for } n = 1, \ldots, L \\ 1.0 & \text{for } n = L+1, \ldots, N-L, \\ 0.5 + 0.5\cos(\pi + \pi \cdot (N-n+1)/L) & \text{for } n = N-L+1, \ldots, N \end{cases} \quad \text{Eq (1)}$$

where $w_{rc}(n)$ is a raised cosine window function, n is sample index, and L is the window transition width or roll-off, in number of samples.

Window function $w_{rc}(n)$ is non-zero for n=1, . . . , N and zero for all other values of n. Window function $w_{rc}(n)$ transitions from 0.0 to 1.0 in the first L samples on the leading edge and transitions from 1.0 to 0.0 in the last L samples on the falling edge. L is the window transition width and determines the roll-off at both the leading and trailing edges. L may be a configurable parameter that may be selected based on the number of assigned subcarriers, the modulation scheme, etc. For example, L may be proportional to N. L may also be inversely related to the modulation order, e.g., a smaller L may be selected for a higher modulation order, and vice versa.

In another design, the spectral shaping is based on a root raised cosine window $w_{rrc}(n)$, which may be expressed as $w_{rrc}(n) = \sqrt{w_{rc}(n)}$. The spectral shaping may also be based on other windows.

Figure 7A:
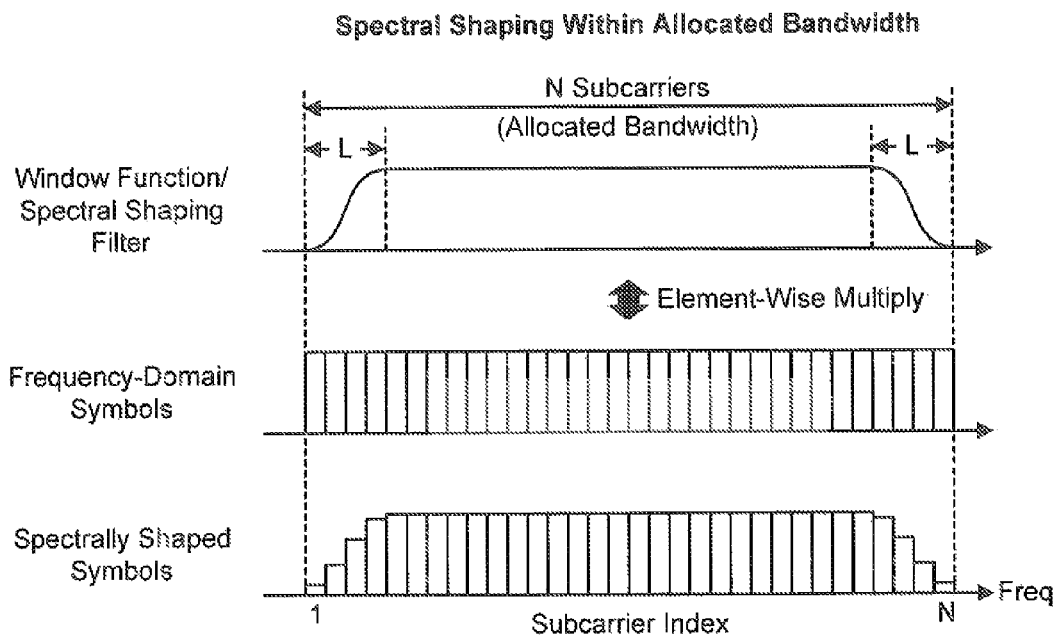
FIG. 7A shows spectral shaping within an allocated bandwidth.

FIG. 7A illustrates spectral shaping in the frequency domain within an allocated bandwidth of N subcarriers. A window function or spectral shaping filter containing N non-zero values may be defined based on a raise cosine window, a root raised cosine window, etc. The N non-zero values of the window function may be multiplied element-wise with N frequency-domain symbols from DFT unit 612 to obtain N spectrally shaped symbols. For the window function shown in equation (1), the first and last L frequency-domain symbols are attenuated by the window function, and the remaining frequency-domain symbols are unaffected by the window function. The spectral shaping may be performed within the allocated bandwidth of N subcarriers as shown in FIG. 7A. In this case, no signal components are present outside of the allocated bandwidth.

Figure 7B:
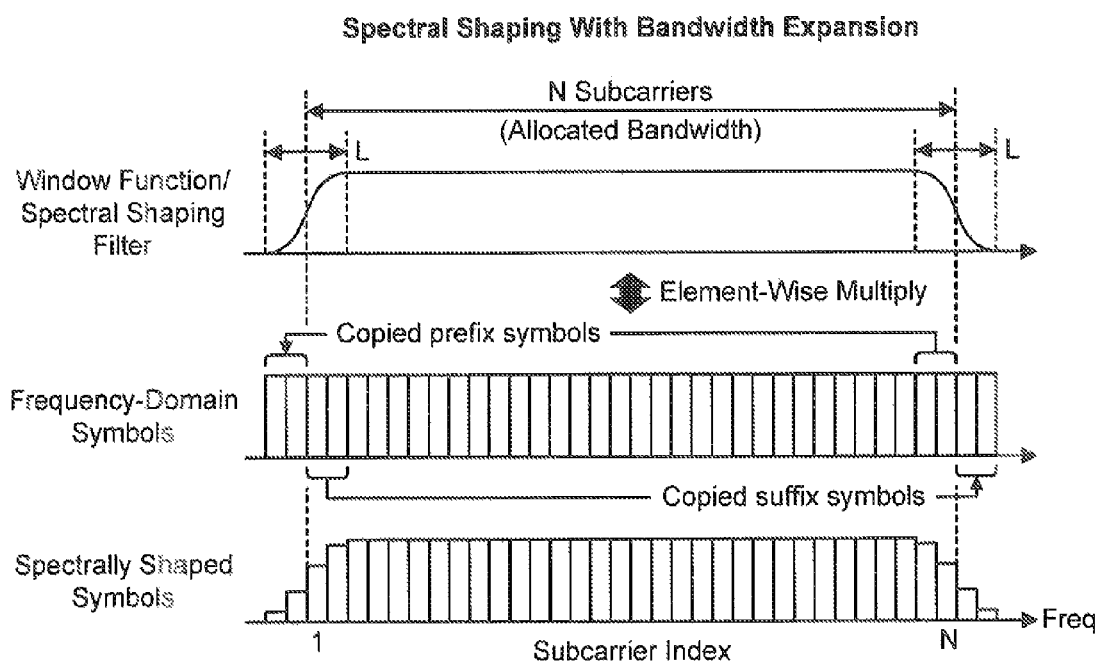
FIG. 7B shows spectral shaping with bandwidth expansion.

FIG. 7B illustrates spectral shaping in the frequency domain with bandwidth expansion. A window function containing more than N (or N') non-zero values may be defined based on a raise cosine window, a root raised cosine window, etc., where N'>N. For example, the window function may be defined such that its midpoint (0.5) is located at the edges of the allocated bandwidth, as shown in FIG. 7B. The N frequency-domain symbols from DFT unit 612 may be repeated, and an appropriate number of prefix symbols and suffix symbols may be appended at the beginning and end of these N frequency-domain symbols such that the total number of frequency-domain symbols (N') matches the length of the window function. The N' non-zero values of the window function may then be multiplied element-wise with the N' frequency-domain symbols to obtain N' spectrally shaped symbols. The spectral shaping with bandwidth expansion may result in some signal components being present outside of the allocated bandwidth.

For spectral shaping within the allocated bandwidth and spectral shaping with bandwidth expansion, the PAR of the resultant signal may be dependent on the modulation scheme, the number of subcarriers, the window roll-off, etc. An appropriate window function and/or a parameter of the window function (e.g., roll-off) may be selected to achieve the desired PAR for a given modulation scheme and a given number of subcarriers.

Figure 8:
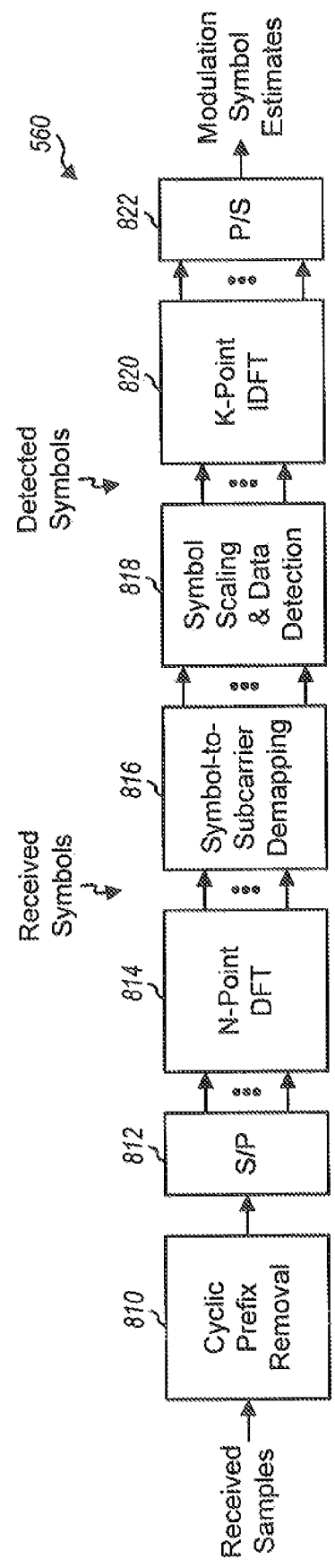
FIG. 8 shows a block diagram of an SC-FDM demodulator.

FIG. 8 shows a block diagram of a design of SC-FDM demodulator 560 at Node B 110 in FIG. 5. Within SC-FDM demodulator 560, a cyclic prefix removal unit 810 obtains K+C received samples for each received SC-FDM symbol, removes C received samples corresponding to the cyclic prefix, and provides K received samples for the useful portion of the received SC-FDM symbol. A serial-to-parallel converter 812 provides the K received samples is parallel form. A DFT unit 814 performs a K-point DFT on the K received samples and provides K received symbols. A symbol-to-subcarrier demapping unit 816 provides N received symbols from the N subcarriers assigned to the UE and discards the remaining received symbols. A unit 818 scales the N received symbols based on the spectral shaping performed by UE 120. Unit 818 further perform data detection (e.g., matched filtering, equalization, etc.) on the N scaled symbols with channel gain estimates and provides N detected symbols. An IDFT unit 820 performs an N-point IDFT on the N detected symbols and provides N modulation symbol estimates for the received SC-FDM symbol.

For clarity, the techniques have been specifically described for uplink transmission from a UE to a Node B. The techniques may also be used for downlink transmission from a Node B to a UE, for peer-to-peer transmission from a UE to another UE, etc. The techniques may be used for various wireless communication systems and networks. For example, the techniques may be used for wireless wide area networks (WWANs) such as cellular networks and broadcast networks, wireless metropolitan area networks (WMANs), wireless local area networks (WLANs), etc.

Figures 9, 10:
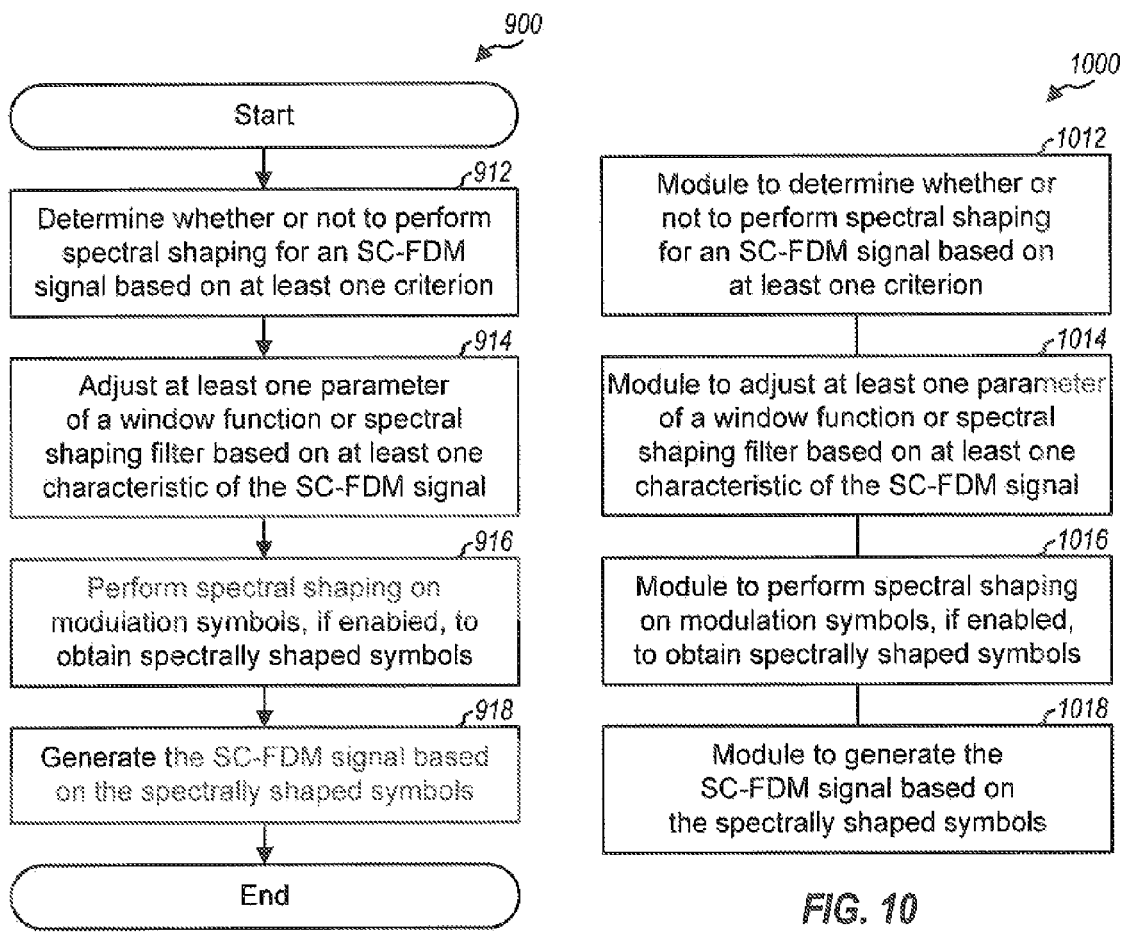
FIG. 9 shows a process performed by a transmitter for data transmission.
FIG. 10 shows an apparatus for data transmission.

FIG. 9 shows a design of a process 900 performed by a transmitter (e.g., a UE or a Node B) for data transmission. Whether or not to perform spectral shaping for an SC-FDM signal may be determined based on a least on criterion (block 912). For example, spectral shaping may be performed in transmit power limited conditions and/or if a modulation scheme with lower PAR is unavailable. Whether or not to perform spectral shaping may also be determined based on at least one characteristic of the SC-FDM signal, e.g., based on the modulation scheme and/or the number of subcarriers used of the SC-FDM signal. The transmitter may decide whether or not to perform spectral shaping. Alternatively, the transmitter may be directed to apply or not apply spectral shaping by a receiver, in which case the transmitter may simply check a command or signaling from the receiver for block 912. If spectral shaping is performed, then at least one parameter of a window function or spectral shaping filter may be adjusted based on at least on characteristic of the SC-FDM signal (block 914). For example, the roll-off of the spectral shaping filter may be adjusted based on the modulation scheme and/or the number of subcarriers used for the SC-FDM signal.

Spectral shaping may be performed on modulation symbols, if enabled, to obtain spectrally shaped symbols (block 916). The spectral shaping may be performed in the frequency domain either within an allocated bandwidth (e.g., as shown in FIG. 7A) or with bandwidth expansion (e.g., as shown in FIG. 7B). The modulation symbols may be transformed to the frequency domain to obtain frequency-domain symbols. Spectral shaping may then be performed on the frequency-domain symbols, e.g., by multiplying the frequency-domain symbols element-wise with the window function, to obtain the spectrally shaped symbols.

The SC-FDM signal may be generated based on the spectrally shaped symbols (block 918). The spectrally shaped symbols may be mapped to a set of contiguous subcarriers for LFDM, a set of subcarriers distributed across the system bandwidth for IFDM, or some other set of subcarriers. The SC-FDM signal may be generated based on the mapped spectrally shaped symbols, e.g., by transforming the mapped symbols to the time domain and appending a cyclic prefix to each SC-FDM symbol.

FIG. 10 shows a design of an apparatus 1000 for transmission. Apparatus 1000 includes means for determining whether or not to perform spectral shaping for an SC-FDM signal based on at least one criterion (module 1012), means for adjusting at least one parameter of a window function or spectral shaping filter based on at least one characteristic of the SC-FDM signal (module 1014), means for performing spectral shaping on modulation symbols, if enabled, to obtain spectrally shaped symbols (module 1016), and means for generating the SC-FDM signal based on the spectrally shaped symbols (module 1018). Modules 1012 to 1018 may comprise processors, electronics devices, hardware devices, electronics components, logical circuits, memories, etc., or any combination thereof.

FIG. 11 shows a design of a process 1100 performed by a receiver (e.g., a Node B or a UE) for data reception. An SC-FDM signal carrying spectrally shaped symbols may be received (block 1112). The SC-FDM signal may be processed to obtain modulation symbol estimates for a set of subcarriers used for transmission (block 1120). For block 1120, received samples for the SC-FDM signal may be transformed to the frequency domain to obtain received symbols for a plurality of subcarriers (block 1122). Symbol scaling may then be performed on received symbols for the set of subcarriers used for transmission, based on the spectral shaping performed by a transmitter, to obtain scaled symbols (block 1124). Data detection may be performed on the scaled symbols to obtain detected symbols (also block 1124). The detected symbols may be transformed to the time domain to obtain the modulation symbol estimates (block 1126).

FIG. 12 shows a design of an apparatus 1200 for data reception. Apparatus 1200 includes means for receiving an SC-FDM signal carrying spectrally shaped symbols (module 1212) and means for processing the SC-FDM signal to obtain modulation symbol estimates for a set of subcarriers used for transmission (module 1220). Module 1220 may include means for transforming received samples for the SC-FDM signal to the frequency domain to obtain received symbols for a plurality of subcarriers (module 1222), means for performing symbol scaling and data detection on received symbols for the set of subcarriers used for transmission to obtain detected symbols (module 1224), and means for transforming the detected symbols to the time domain to obtain the modulation symbol estimates (module 1226). Modules 1212 to 1226 may comprise processors, electronics devices, hardware devices, electronics components, logical circuits, memories, etc. or any combination thereof.

The techniques described herein may be implemented by various means. For example, these techniques may be implemented in hardware, firmware, software, or a combination thereof. For a hardware implementation, the processing units at an entity (e.g., a UE or a Node B) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software codes may be stored in a memory (e.g., memory 532 or 582 in FIG. 5) and executed by a processor (e.g., processor 530 or 580). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
  at least one processor configured to:
    determine a number of subcarriers used in a single-carrier frequency division multiplexing (SC-FDM) signal, and a first modulation scheme used to generate the modulation symbols for the SC-FDM signal, the first modulation scheme having an associated order and a peak-to-average ratio (PAR),
    determine whether the apparatus is operating in transmit power limited conditions based on the determined number of subcarriers,
    determine whether the apparatus supports a second modulation scheme with an order lower than the order of the first modulation scheme and a PAR lower than the PAR of the first modulation scheme,
    perform spectral shaping when it is determined that both the apparatus is operating in the transmit power limited conditions and the apparatus does not support the second modulation scheme having the lower order and the lower PAR, the spectral shaping performed by:
      adjusting at least one parameter of a spectral shaping filter based on one or more characteristics of the SC-FDM signal, the one or more characteristics including at least one of a modulation scheme used to generate the modulation symbols and number of subcarriers used for the SC-FDM signal; and
      performing the spectral shaping on modulation symbols using the spectral shaping filter to obtain spectrally shaped symbols,
    bypass performing the spectral shaping when it is determined that either the apparatus is not operating in the transmit power limited conditions or the apparatus supports the second modulation scheme having the lower order and the lower PAR, and
    generate the SC-FDM signal based on the spectrally shaped symbols or the modulation symbols; and
  a memory coupled to the at least one processor.

2. The apparatus of claim 1, wherein the at least one processor is configured to perform spectral shaping in frequency domain within an allocated bandwidth.

3. The apparatus of claim 1, wherein the at least one processor is configured to perform spectral shaping in frequency domain with bandwidth expansion.

4. The apparatus of claim 1, wherein the at least one processor is configured to transform the modulation symbols to frequency domain to obtain frequency-domain symbols, and to perform spectral shaping on the frequency-domain symbols to obtain the spectrally shaped symbols.

5. The apparatus of claim 4, wherein the at least one processor is configured to perform spectral shaping by multiplying the frequency-domain symbols with a window function to obtain the spectrally shaped symbols.

6. The apparatus of claim 1, wherein the at least one processor is configured to receive a command to perform spectral shaping and to perform spectral shaping as indicated by the received command.

7. The apparatus of claim 1, wherein the at least one processor is configured to map the spectrally shaped symbols to a set of contiguous subcarriers and to generate the SC-FDM signal based on the mapped spectrally shaped symbols.

8. The apparatus of claim 1, wherein the at least one processor is configured to map the spectrally shaped symbols to a set of subcarriers distributed across system bandwidth and to generate the SC-FDM signal based on the mapped spectrally shaped symbols.

9. The apparatus of claim 1, wherein the processor is further configured to send signaling to an apparatus for decoding the signal when spectral shaping is applied, the signaling indicating to the apparatus for decoding that spectral shaping was applied to the SC-FDM signal.

10. A method comprising:
  determining a number of subcarriers used in a single-carrier frequency division multiplexing (SC-FDM) signal, and a first modulation scheme used to generate the modulation symbols for the SC-FDM signal, the first modulation scheme having an associated order and a peak-to-average ratio (PAR);
  determining whether an apparatus is operating in transmit power limited conditions based on the determined number of subcarriers;
  determining whether the apparatus supports a second modulation scheme having an order lower than the order of the first modulation scheme and a PAR lower than the PAR of the first modulation scheme,
  performing spectral shaping in response to both determining that the apparatus is operating in the transmit power limited conditions and determining that the apparatus does not support the second modulation scheme having the lower order and the lower PAR;
  bypassing performing the spectral shaping in response to either determining that the apparatus is not operating in the transmit power limited conditions or determining that the apparatus supports the second modulation scheme having the lower order and the lower PAR;

generating a SC-FDM signal based on the modulation symbols when not in the transmit power limited conditions; and generating a SC-FDM signal based on the spectrally shaped symbols when in the transmit power limited conditions;

wherein performing spectral shaping comprises:

adjusting at least one parameter of a spectral shaping filter based on at least one characteristic of the SC-FDM signal, and performing spectral shaping on the modulation symbols based on the spectral shaping filter.

11. The method of claim 10, wherein the performing spectral shaping comprises performing spectral shaping in frequency domain within an allocated bandwidth.

12. The method of claim 10, wherein the performing spectral shaping on the modulation symbols comprises transforming the modulation symbols to frequency domain to obtain frequency-domain symbols, and performing spectral shaping on the frequency-domain symbols to obtain the spectrally shaped symbols, and wherein the generating the SC-FDM signal comprises:

mapping the spectrally shaped symbols to a set of subcarriers, and generating the SC-FDM signal based on the mapped spectrally shaped symbols.

13. The method of claim 10, further comprising sending signaling to an apparatus for decoding the signal when spectral shaping is applied, the signaling indicating to the apparatus for decoding that spectral shaping was applied to the SC-FDM signal.

14. An apparatus comprising:

means for determining a number of subcarriers used in a single-carrier frequency division multiplexing (SC-FDM) signal, and a first modulation scheme used to generate the modulation symbols for the SC-FDM signal, the first modulation scheme having an associated order and a peak-to-average ratio (PAR);

means for determining whether an apparatus is operating in transmit power limited conditions based on the determined number of subcarriers;

means for determining whether the apparatus supports a second modulation scheme having an order lower than the order of the first modulation scheme and a PAR lower than the PAR of the first modulation scheme;

means for performing spectral shaping when both the means for determining whether the apparatus is operating in the transmit power limited conditions determines that the apparatus is operating in the transmit power limited conditions and the means for determining whether the apparatus supports the second modulation scheme determines that the apparatus does not support the second modulation scheme having the lower order and the lower PAR, wherein performing the spectral shaping is bypassed when either the means for determining whether the apparatus is operating in the transmit power limited conditions determines that the apparatus is not operating in the transmit power limited conditions or the means for determining whether the apparatus supports the second modulation scheme determines that the apparatus supports the second modulation scheme having the lower order and the lower PAR;

means for performing spectral shaping on modulation symbols to obtain spectrally shaped modulation symbols, wherein the modulation symbols are spectrally shaped when the apparatus is operating in the transmit power limited conditions; and means for generating a SC-FDM signal, wherein the SC-FDM signal is generated based on the spectrally shaped symbols when the apparatus is operating in the transmit power limited conditions, and based on the modulation symbols when the apparatus is not operating in the transmit power limited conditions;

wherein the means for performing spectral shaping comprises:

means for adjusting at least one parameter of a spectral shaping filter based on at least one characteristic of the SC-FDM signal, and means for performing spectral shaping on the modulation symbols based on the spectral shaping filter.

15. The apparatus of claim 14, further comprising means for sending signaling to an apparatus for decoding the signal when spectral shaping is applied, the signaling indicating to the apparatus for decoding that spectral shaping was applied to the SC-FDM signal.

16. A non-transitory computer-readable medium including instructions stored thereon, comprising:

a first instruction set for performing spectral shaping on modulation symbols to obtain spectrally shaped symbols;

a second instruction set for generating a single-carrier frequency division multiplexing (SC-FDM) symbols, wherein the SC-FDM is based on the spectrally shaped symbols when in transmit power limited conditions and wherein the SC-FDM is based on the modulation symbols when not in the transmit power limited conditions; and a third instruction set for determining a number of subcarriers used in a SC-FDM signal, and determining whether an apparatus is operating in the transmit power limited conditions based on the determined number of subcarriers, and determining a first modulation scheme used to generate the modulation symbols for the SC-FDM signal, the first modulation scheme having an associated order and a peak-to-average ratio (PAR), and determining whether the apparatus supports a second modulation scheme having an order lower than the order of the first modulation scheme and a PAR lower than the PAR of the first modulation scheme;

wherein the first instruction set for performing spectral shaping is executed when it is determined that both the apparatus is operating in the transmit power limited conditions and the apparatus does not support the second modulation scheme having the order lower and the lower PAR, and wherein the first instruction set comprises instructions for:

adjusting at least one parameter of a spectral shaping filter based on at least one characteristic of the SC-FDM signal, and performing spectral shaping on the modulation symbols based on the spectral shaping filter: and wherein execution of the first instruction set for performing spectral shaping is bypassed when it is determined that either the apparatus is not operating in the transmit power limited conditions or the apparatus supports the second modulation scheme having the lower order and the lower PAR.

17. The non-transitory computer-readable medium of claim 16, further comprising a fourth instruction set for sending signaling to an apparatus for decoding the signal when spectral shaping is applied, the signaling indicating to the apparatus for decoding that spectral shaping was applied to the SC-FDM signal.

* * * * *